(12) United States Patent
Nitsopoulos

(10) Patent No.: US 11,650,865 B1
(45) Date of Patent: *May 16, 2023

(54) SYSTEMS AND METHODS FOR PROCESSING DIGITAL EXPERIENCE INFORMATION

(71) Applicant: The PNC Financial Services Group, Inc., Pittsburgh, PA (US)

(72) Inventor: Michael Nitsopoulos, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/092,991

(22) Filed: Nov. 9, 2020

Related U.S. Application Data

(63) Continuation of application No. 17/010,050, filed on Sep. 2, 2020, now Pat. No. 11,507,438.

(60) Provisional application No. 62/983,535, filed on Feb. 28, 2020.

(51) Int. Cl.
  *G06F 9/54* (2006.01)
  *G06F 16/17* (2019.01)
  *G06Q 40/02* (2023.01)
  *G06Q 20/40* (2012.01)

(52) U.S. Cl.
  CPC .......... *G06F 9/542* (2013.01); *G06F 16/1734* (2019.01); *G06Q 20/405* (2013.01); *G06Q 40/02* (2013.01)

(58) Field of Classification Search
  CPC ... G06F 9/542; G06F 16/1734; G06Q 20/405; G06Q 40/02
  See application file for complete search history.

(56) References Cited

U.S. PATENT DOCUMENTS

| | | | |
|---|---|---|---|
| 2003/0009402 A1 | 1/2003 | Mullen et al. | |
| 2015/0310044 A1 | 10/2015 | Isaacson et al. | |
| 2018/0011860 A1* | 1/2018 | Barhate | G06F 16/41 |
| 2018/0137157 A1* | 5/2018 | Gausman | G06F 16/2272 |
| 2019/0259033 A1* | 8/2019 | Reddy | G06N 5/02 |
| 2020/0117757 A1 | 4/2020 | Yanamandra et al. | |

* cited by examiner

*Primary Examiner* — Emmanuel L Moise
*Assistant Examiner* — Xiang Yu
(74) *Attorney, Agent, or Firm* — Finnegan, Henderson, Farabow, Garrett & Dunner LLP

(57) ABSTRACT

In one implementation, systems and methods are provided for processing digital experience information. A computer-implemented system for processing digital experience information may comprise a central data location. The central data location may comprise a connector that may be configured to receive information belonging to a category from an information source; an event backbone that may be configured to route the information received by the connector based on the category; a translator that may be configured to transform the received information into a common data model; and a database that may be configured to store the received information. The event backbone may be further configured to send information to the connector from the event backbone and the database based on one or more criteria.

20 Claims, 13 Drawing Sheets

SYSTEMS AND METHODS FOR PROCESSING DIGITAL EXPERIENCE INFORMATION

PRIORITY

The present application is a continuation of U.S. patent application Ser. No. 17/010,050, filed on Sep. 2, 2020, which claims priority to U.S. Provisional Patent Application Ser. No. 62/983,535, filed on Feb. 28, 2020, the disclosures of which are incorporated herein by reference.

The present application incorporates by reference Provisional U.S. Patent Application Ser. No. 62/983,529, filed Feb. 28, 2020, and Provisional U.S. Application Ser. No. 62/983,581, filed Feb. 29, 2020. The patent applications cited herein are incorporated by reference in their entireties, except for any definitions, subject matter disclaimers or disavowals, and except to the extent that the incorporated material is inconsistent with the express disclosure herein, in which case the language in this disclosure controls.

TECHNICAL FIELD

The present disclosure relates generally to computer-implemented systems and methods for processing digital experience information. More specifically, and without limitation, this disclosure relates to computer-implemented systems and methods for translating digital experience information into a common data model. The systems and methods disclosed herein may be used in various applications, such as business systems and systems comprising various sources of digital experience information and/or systems of record.

BACKGROUND

In digital application systems, it is often desirable to collect information in a central accessible data location. A central data location simplifies storage and retrieval of information, allowing disparate systems to capture and share data. It also simplifies integration of new features, allowing data collected from an existing system to be used by a new system for example, reducing the time needed to release new features and applications, Existing systems and methods for processing digital experience information, however, suffer from a number of drawbacks, including the inability to provide real-time information. In addition, existing systems and methods are unable to perform deep data exploration, since handling large data with existing systems of record is cost prohibitive. Furthermore, existing systems and methods are cumbersome to use in that they require complex integration and intricate data schema designs to operate.

In view of the foregoing, the inventors have identified that there is a need for improved systems and methods for processing digital experience information.

SUMMARY

In view of the foregoing, embodiments of the present disclosure provide computer-implemented systems and methods for processing digital experience information. The description below provides exemplary aspects of some computer-implemented systems and methods for processing digital experience information in accordance with some exemplary embodiments. Aspects may be combined with one or more suitable described aspects or other undescribed aspects, Aspects of one exemplary system or method may be combined with aspects of other exemplary systems, methods, or both.

An exemplary computer-implemented system for processing digital experience information may comprise a system of record configured to receive, from a publisher, a transactional event. The transactional event may comprise a transactional event data. The system may comprise a central data location communicatively connected to the system of record. The central data location may comprise an ingestion connector configured to receive the transactional event data from the system of record. The central data location may comprise a translator configured to transform the transactional event data from the ingestion connector into a common data scheme. The central data location may comprise an event backbone communicatively connected to the translator. The event backbone may comprise a topic. The topic may comprise the transactional event data in the common data scheme received from the translator. The central data location may include an event store communicatively connected to the event backbone. The event store may be configured to receive a topic from the event backbone, The event store may be configured to store the topic in a storage system. The central data location may include a streaming processor configured to stream the transactional event data to a subscriber.

The common data scheme may be configured to allows integration between transactional events.

The storage system ay be configured to allow an out-of-order query to modify query cost.

The streaming processor may be configured to stream the transactional event in real-time.

The streaming processor may be configured to receive the transactional event data from the event backbone. The event backbone may be configured to receive the transactional event data from the event store.

The streaming processor may be configured to receive the transactional data from the event store. The event backbone may be communicatively connected to the ingestion connector.

The event backbone may comprise an ingestion topic comprising the transactional event data before it is transformed, by the translator, into the common data scheme. The common data scheme may be BIAN (Banking Industry Architecture Network). The topic may be a BAN topic. The translator may be configured to transform the transactional event data from the ingestion connector into a BIAN-compliant data scheme.

The event backbone may comprise a purpose-built topic comprising a portion of the transactional event data that is not compliant with the common data scheme.

The central data location may comprise a business rules engine configured to supply business rules to the streaming processor. The streaming processor may be further configured convert the transactional event data into the common data scheme using the business rules.

The streaming processor may comprise a business rule, and the streaming processor may be further configured to convert the transactional event data into the common data scheme using the business rule, The event backbone may further comprise a sink connector communicatively connected to the event store. The sink connector may be configured to transform the transactional event data from a topic into a query data scheme for storage in the event store. The sink connector may be configured to write the topic to the event store, The event backbone may further comprise an access logs topic communicatively coupled to a log management system. The access logs topic may be configured to record access to the event backbone.

The event store may be further configured to permanently store the transactional event. The event store may comprise a database. The database may be a RDBMS database. The database may be a NoSQL database.

An exemplary computer-implemented method for processing digital experience information may comprise the step of receiving a transactional event from a publisher The transactional event may comprise transactional event data. The method may comprise the step of determining whether the transactional event data is compliant with a common data scheme. The method may comprise the step of transforming the transactional event data into common data scheme compliant data. The method may comprise the step of storing the common data scheme data in an event store. The method may comprise the step of exposing the common data scheme compliant data to a subscriber in real-time.

The method may comprise the step of receiving a request from the subscriber to expose the common data scheme compliant data. The request may allow the subscriber to query the common data scheme compliant data on an ad-hoc basis.

An exemplary computer-implemented system for processing digital experience information may comprise a central data location. The central data location may comprise an ingestion connector. The ingestion connector may be configured to receive, from a system of record, a transactional event comprising transactional event data. The ingestion connector may be configured to collect the transactional event data from the transactional event. The ingestion connector may be configured to place the transactional event data onto a data scheme topic. The ingestion connector may comprise a change data capture configured to determine and track data changes. The central data location may include an event backbone. The event backbone may be communicatively connected to the ingestion connector. The event backbone may comprise a common data scheme topic comprising one or a plurality of transactional events. The common data scheme topic may be formed from the data scheme topic. The central data location may comprise an event store communicatively connected to the event backbone. The event store may be configured to receive the common data scheme topic from the event backbone. The event store may be configured to store the common data scheme topic in a storage system. The central data location may comprise a streaming processor configured to stream the transactional event data to a subscriber.

The common data scheme topic may comprise transactional event data that the change data capture determined is changed.

The ingestion connector may further comprise a message-oriented middleware component communicatively connected to the change data capture.

The ingestion connector may further comprise a connecting logic communicatively connected to the change data capture. The connecting logic may be configured to connect the ingestion connector to the event backbone.

The system of record may be configured to be aware of the event backbone, allowing the ingestion connector to receive the transactional event in real-time.

An exemplary computer-implemented system for processing digital experience information may comprise a central data location. The central data location may comprise an ingestion connector. The ingestion connector may be configured to receive, from a system of record, a batch file. The batch file may comprise transactional event data. The ingestion connector may comprise a batch file processor. The batch file processor may be configured to place the transactional event data onto a data scheme topic. The central data location may comprise an event backbone. The event backbone may comprise a common data scheme topic. The common data scheme topic may comprise one or a plurality of transactional events. The common data scheme topic may be formed from the data scheme topic. The central data location may comprise an event store configured to store the common data scheme topic. The central data location may comprise a streaming processor configured to stream, to a subscriber, a data scheme message.

The system of record may be configured to be aware of the event backbone, allowing the ingestion connector to receive the transactional event in real-time.

An exemplary computer-implemented system for processing digital experience information may comprise a central data location. The central data location may comprise a publisher configured to publish, to a system of record, a transactional event comprising transactional event data. The publisher may be configured to collect the transactional event data from the transactional event. The publisher may be configured to place the transactional event data onto a data scheme topic. The data scheme topic may comprise a data scheme message. The central data location may comprise an event backbone. The event backbone may comprise a common data scheme topic. The common data scheme topic may comprise one or a plurality of transactional events. The common data scheme topic may be formed from the data scheme message. The central data location may comprise an event store configured to store the common data scheme topic. The central data location may comprise a streaming processor configured to stream, to a subscriber, the data scheme message.

The central data location may further comprise a business rules engine configured to supply business rules to the publisher. The publisher may be further configured to convert the transactional event data into a common data scheme using the business rules. The publisher may comprise a business rule. The publisher may be further configured to convert the transactional event data into a common data scheme using the business rule.

An exemplary computer-implemented system for processing digital experience information may comprise a central data location. The central data location may comprise an ingestion connector. The ingestion connector may be configured to receive in real-time, from a system of record, a transactional event comprising transactional event data. The ingestion connector may be configured to collect the transactional event data from the transactional event. The ingestion connector may be configured to place the transactional event data onto an ingestion topic in an ingestion topic message. The central data location may comprise a translator configured to transform the ingestion topic message into a common data scheme message. The central data location may comprise an event backbone. The event backbone may comprise a topic comprising one or a plurality of transactional events. The topic may be formed from the common data scheme message. The central data location may comprise an event store configured to store the topic. The central data location may comprise a streaming processor configured to stream, to a subscriber, the common data scheme message.

The translator may be further configured to enrich the ingestion topic message with external data by calling an API.

The external data may be BIAN compliant data. The external data may be geographic data. The API may be communicatively coupled to a library. The API may be configured to convert the common data scheme message into a BIAN compliant data scheme.

An exemplary computer-implemented system for processing digital experience information may comprise a central data location. The central data location may comprise an ingestion connector. The ingestion connector may be configured to receive n real-time, from a system of record, a transactional event comprising transactional event data. The ingestion connector may be further configured to collect the transactional event data from the transactional event. The ingestion connector may be further configured to place the transactional event data into a common data scheme message. The ingestion connector may be further configured to place the common data scheme message containing the transactional event data onto a topic. The topic may comprise one or a plurality of transactional events. The central data location may comprise a sink connector configured to transform the topic into a purpose-built topic. The sink connector may be configured to write the topic to an event store. The central data location may comprise an event store configured to store the topic. The central data location may comprise a streaming processor. The streaming processor may be configured to transform the common data scheme message into a query message. The streaming processor may be configured to stream the query message to a subscriber.

The event store may be a JDBC compliant data store. The sink connector may be a JDBC sink connector.

The streaming processor may be further configured to enrich the common data scheme message with external data by calling an API. The external data may be BIAN compliant data The external data may be geographic data. The API may be communicatively coupled to a library. The API may be configured to convert the common data scheme message into a BIAN compliant data scheme.

The central data location may further comprise a business rules engine. The business rules engine may be configured to supply business rules to the streaming processor. The streaming processor may be configured to transform the common data scheme message into the query message using the business rules.

The streaming processor may further comprise a business rule. The streaming processor may be configured to transform the common data scheme message into the query message using the business rule.

An exemplary computer-implemented system for processing digital experience information may comprise a central data location. The central data location may comprise an ingestion connector. The ingestion connector may be configured to receive in real-time, from a system of record, a transactional event comprising transactional event data. The ingestion connector may be further configured to collect the transactional event data from the transactional event. The ingestion connector may be configured to place the transactional event data into a common data scheme message. The ingestion connector may be configured to place the common data scheme message containing the transactional event data onto a topic. The topic may comprise one or a plurality of transactional events. The central data location may comprise an event store configured to store the to plc. The central data location may comprise a streaming processor. The streaming processor may be configured to write the topic to the event store. The streaming processor may be configured to read the topic from the event store. The streaming processor may be configured to expose the topic to a subscriber.

The streaming processor may comprise a cache. The streaming processor may be further configured to read the topic from the cache.

The streaming processor may be further configured to enrich the common data scheme message, with external data, by calling an API. The external data may be BIAN compliant data The external data may be geographic data. The API may be communicatively coupled to a library. The API may be configured to convert the common data scheme message into a BIAN compliant data scheme. The central data location may further comprise a business rules engine configured to supply business rules to the streaming processor. The streaming processor may be further configured to convert the common data scheme message from the topic into a query message using the business rules. The streaming processor may be configured to place the query message onto a topic.

The streaming processor may comprise a business rule. The streaming processor may be further configured to convert the common data scheme message from the topic into a query message using the business rule. The streaming processor may be further configured to place the query message onto a topic.

The streaming processor may be further configured to indicate a current state of the subscriber. The current state may comprise requesting the topic. The current state may comprise having received the topic.

An exemplary computer-implemented system for processing digital experience information may comprise a central data location. The central data location may comprise an ingestion connector. The ingestion connector may be configured to receive in real-time, from a system of record, a transactional event comprising transactional event data. The ingestion connector may be configured to collect the transactional event data from the transactional event. The ingestion connector may be configured to place the transactional event data, in a common data scheme message, onto a topic comprising one or a plurality of transactional events. The central data location may comprise an event store. The event store may be configured to store the topic. The event store may be able to expose the topic to a subscriber.

The event store may be configured to expose the topic using an API interface. The API interface may be configured to use a MICRON framework. The event store may comprise an event store schema. The API interface may comprise an API schema. The event store schema may follow the API schema. The event store schema may be identical to the API schema.

The subscriber may comprise an internal cache.

The subscriber may comprise an external cache.

An exemplary computer-implemented system for processing digital experience information may comprise a central data location. The central data location may comprise an ingestion connector. The ingestion connector may be configured to receive in real-time, from a system of record, a transactional event. The transactional event may comprise transactional event data. The ingestion connector may be configured to collect the transactional event data from the transactional event. The ingestion connector may be configured to place the transactional event data, in a common data scheme message, onto a topic. The topic may comprise one or a plurality of transactional events. The topic may be configured to expose the common data scheme message to a subscriber.

The topic may be configured to expose the common data scheme message using an API. The subscriber may comprise an internal cache. The subscriber may comprise an external cache. The API may be configured to read the topic. The topic may be a Kafka topic.

An exemplary computer-implemented system for processing digital experience information may comprise a central data location. The central data location may comprise an ingestion connector. The ingestion connector may be configured to receive in real-time, from a system of record, a transactional event. The transactional event may comprise transactional event data. The ingestion connector may be further configured to collect the transactional event data from the transactional event. The ingestion connector may be configured to place the transactional event data onto an ingestion topic in an ingestion topic message. The central data location may comprise a translator configured to transform the ingestion topic message into a common data scheme message. The central data location may comprise an event backbone. The event backbone may comprise a common data scheme topic. The common data scheme topic may comprise one or a plurality of transactional events. The common data scheme topic may be formed from the common data scheme message. The event backbone may comprise an access logs topic communicatively coupled to a log management system. The access logs topic may be configured to record access to the event backbone. The event backbone may comprise a sink connector. The sink connector may be configured to transform the topic into a purpose-built topic. The sink connector may be configured to write the topic to an event store. The central data location may comprise an event store configured to store the topic. The central data location may comprise a streaming processor configured to stream, to a subscriber, the common data scheme message.

The ingestion topic may comprise an ingestion topic schema defined using a schema registry. The common data scheme topic may comprise a common data scheme topic schema defined using the schema registry. The purpose-built topic may comprise a purpose-built topic schema defined using the schema registry. The access log topic may comprise an access log topic schema using the schema registry.

The schema registry may follow a serialization and deserialization standard.

The serialization and deserialization standard may be Apache Avro.

An exemplary computer-implemented central data location may comprise an ingestion connector. The ingestion connector may be configured to receive in real-time, from a system of record, a transactional event comprising transactional event data. The ingestion connector may be configured to collect the transactional event data from the transactional event. The ingestion connector may he configured to determine whether the transactional event data is common data scheme compliant. If the transactional event data is common data scheme compliant, the ingestion connector may be configured to place the transactional event data onto a common data scheme topic in a common data scheme topic message. The common data scheme topic may comprise one or a plurality of transactional events. If the transactional event data is not common data scheme compliant, the ingestion connector may be configured to place the transactional event data onto an ingestion topic in an ingestion topic message. The ingestion connector may be configured to transform the ingestion topic message into a common data scheme message. The ingestion connector may be configured to place the common data scheme message onto a common data scheme topic. The central data location may comprise an event backbone. The event backbone may comprise the ingestion topic. The event backbone may comprise the common data scheme topic. The central data location may comprise an event store. The event store may be configured to store the common data scheme topic. The central data location may comprise a streaming processor. The streaming processor may be configured to stream, to a subscriber, the common data scheme message.

The event backbone may further comprise an access logs topic. The access logs topic may be communicatively coupled to a log management system. The log management system may be configured to record access to the event backbone.

The event backbone may further comprise a sink connector configured to transform the common data scheme topic into a purpose-built topic. The sink connector may be configured to write the topic to an event store. The purpose-built topic may comprise data that is not common data scheme compliant. The event store may be further configured to store the topic.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Systems and Methods with a Central Data Location and Common Data Scheme

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting. All figures discussed herein are to be interpreted inclusively, meaning that aspects of one or more figures may be combined with aspects of any one or more other figures.

Figure 1:
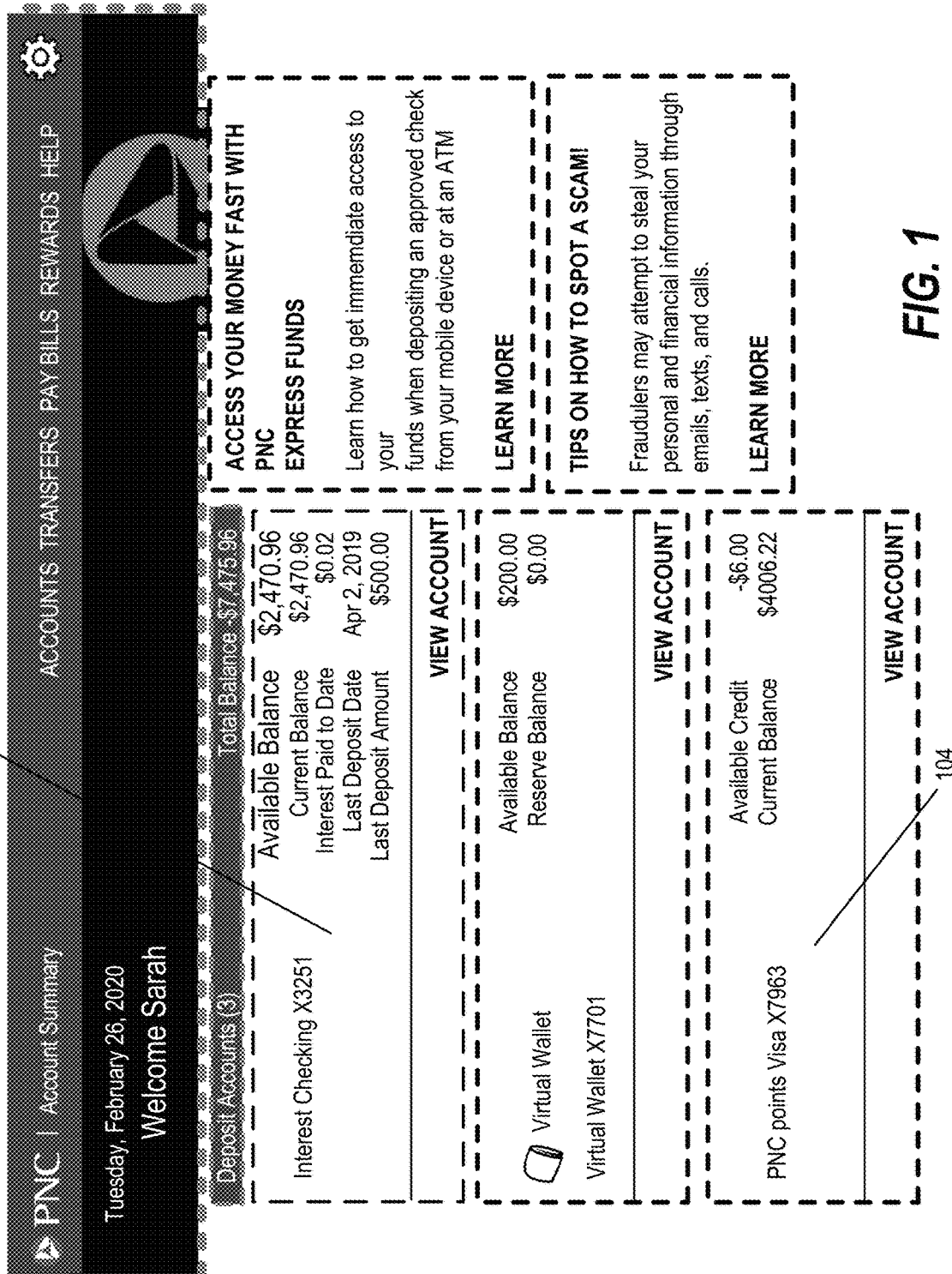
FIG. 1 is a pictorial representation of an exemplary channel application in accordance with some embodiments.

FIG. 1 depicts a channel application 100 that allows a user to view information about banking in accordance with some embodiments. In some embodiments, channel application 100 may include a graphical user interface (GUI) configured to enable and allow a user to view information about banking as described herein. In some embodiments, channel application 100 may be embodied as software stored in nontransitory computer-readable medium that when executed by a processor causes operations, functions, and results described herein to be realized A user may use a channel application 100 on a computer, mobile device (e.g., cellular phone, smart phone, tablet, personal digital assistant, smart appliance, kiosk. etc.), or other electronic device to review or interact with banking information. The channel application 100 may include micro-application 102, that tracks one or ore deposit accounts. The channel application 100 may include a micro-application 104, that creates a summary of one or more credit card accounts. Organizing the channel application 100 into the micro-applications 102 and 104 allows digital application developers to work independently from one another on separate features and functions. The micro-applications 102 and 104 also allow developers to avoid rewriting code for the same tasks when developing new applications.

A micro-application can be configured to perform one or more discrete functions (e.g., by using logic embodied in computer-readable and/or executable code), The micro-application can comprise a front-end configured to receive input from a user (e.g., through buttons, or the like) and/or provide information to the user (e.g., through a display, or the like). For example, a micro-application may contain a front-end created using Angular for receiving user input in the form of mouse-clicks on a browser. The micro-application can comprise an outer interface (e.g., an application programming interface (API), or the like) for receiving and sending information from and to the information processing system using the connector (e.g., using an external application programming interface (API), or the like). For example, a micro-application may contain an outer interface created using Bootstrap, and the processing system may contain a corresponding external application interface for communicating with the outer interface. In some embodiments, the front-end and the outer interface may be deployed as a separate container in a container application (e.g., OpenShift Container Platform, or the like). The micro-application can further comprise an event manager configured to send and receive event information to and from the information processing system, as well as a state manager configured to send and receive state information to and from the information processing system. For example, the event manager may publish information regarding business events such as financial transactions by a customer to the event backbone through a system of recording using a first external application programming interface (API), and the state manager may receive information regarding the customer's present account balance from the event backbone using a second external application programming interface (API). In this manner, the read and write functionality between micro-applications and the processing system may be scaled differently.

When an event or a transaction occurs, a respective micro-application using data from such events or transactions will need to update with new information so as to provide the user with the correct information. For example, if the user makes a deposit into their checking account, the user may want, to see the new balance and the amount deposited into the account. As another example, the user may want to see the amount they have charged to their credit card in another event. When an event occurs, a set of data may be generated in a variety of schemes. For example, in the event of a credit card transaction, the event may generate data that includes the credit card number and the dollar amount of the transaction. In a bank transfer, the transaction may generate data, including a bank account number. Different transactions and different protocols generate data that is organized in different formats or data schemas.

Different data schemes can cause a number of issues, including adding complexity to communications between micro-applications, requiring specific code to be written for two or more micro-applications to share information. This adds increased cost and time to developers. Some embodiments disclosed herein reduce or eliminate the complexity of programming different micro-applications to handle data of different data schemes. The embodiments disclosed herein allow channel application 100 and micro-applications 102 and 104 to access data in a common data scheme such that the data is easily used as input, output, or both. Specifically and by way of example, some embodiments involve creating a book of reference in a common data scheme such that the micro-applications may more readily access and write data—without each application needed to process the data itself. These embodiments provide numerous advantages to developers of applications such as the channel application 100 and the micro-applications 102 and 104, providing efficiency to developers and to the systems that process the data. Additionally, the benefits may be realized by a user. For example, the systems may more readily allow a user to view banking information in the channel application 100 and the micro-applications 102 and 104 in real time, since the data is more easily and efficiently accessed by the applications 100 through 104.

Figure 2:
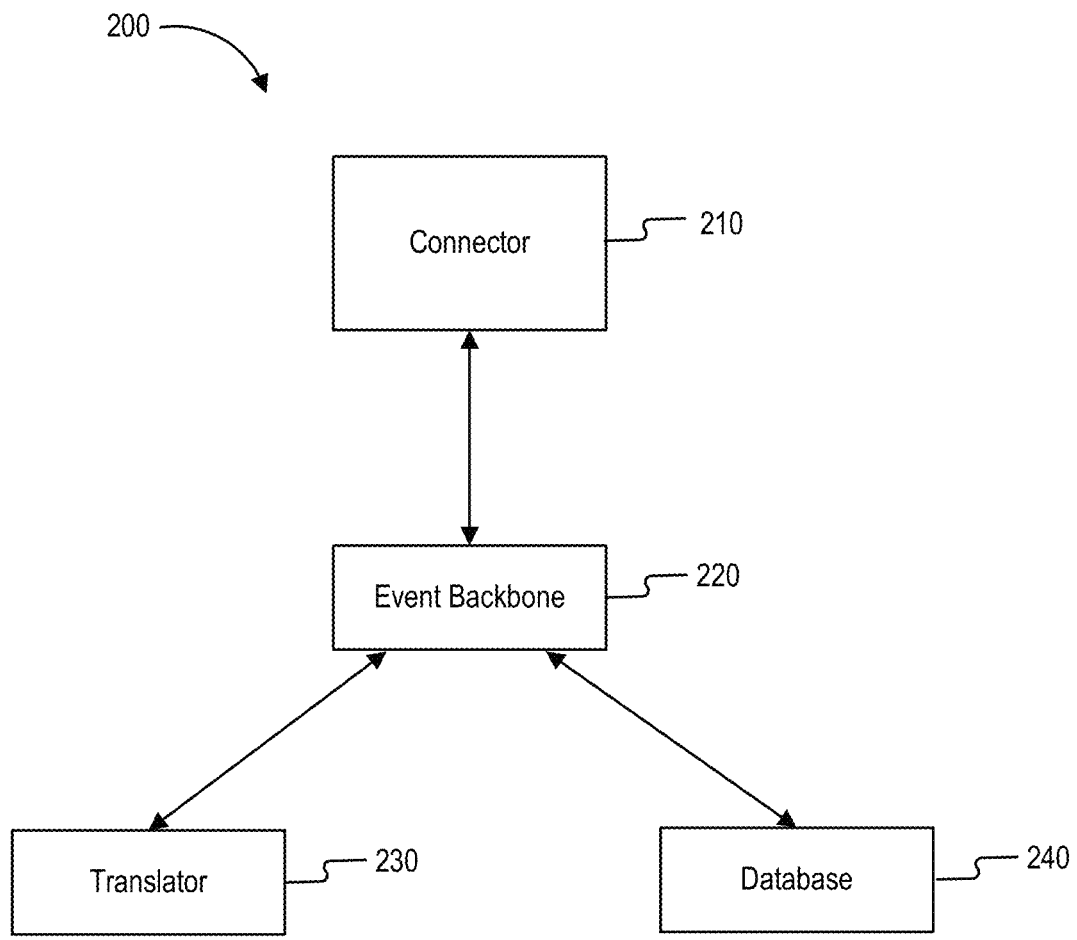
FIG. 2 is a schematic representation of an exemplary computer-implemented system for processing digital experience information in accordance with some embodiments.

FIG. 2 depicts an exemplary computer-implemented system 200 for processing digital experience information, in accordance with some embodiments. System 200 may comprise one or more connectors (e.g., connector 210) that may be configured to send and receive information belonging to a category to and from one or more sources of information; one or more event backbones (e.g., event backbone 220) that may be configured to route the received information using the category; one or more translators (e.g., translator 230) that may be configured to transform received information into a common data model; and one or more databases (e.g., database 240) for storing the received information. In some embodiments, system 200 may comprise a streaming component (not shown) that may be configured to read information in system 200 on an ad-hoc or real-time basis, and which may be configured to further process the information. In various embodiments, system 200 may further comprise a dashboard (not shown) that may be configured to manage information in system 200 (e.g., by interacting with backbone 220 or database 240).

Connector 210 may be configured to send and receive information belonging to a category to and from one or more sources of information. In some embodiments, connector 210 may comprise an interface. For example, connector 210 may comprise an external application programming interface (API) that a digital application (e.g., a micro-application) may use to send and receive information to and from connector 210. In various embodiments, connector 210 may comprise an ingestion connector configured to send and receive information to and from one or more systems of record. For example, connector 210 may comprise a message-oriented middleware component (e.g. MQ, or the like) and connecting logic created using a stream-processing software platform (e.g., ActiveMQ, RabbitMQ, Amazon Kinesis, Apache Spark, Akka, Apache Storm Apache Flink, Perlis, ZeroMQ, or the like). As an additional example, connector 210 may further comprise logic configured to determine and track data that has changed (e.g., change data capture (CDC), or the like). As a further example, connector 210 may comprise logic configured to receive information periodically. For example, connector 210 may comprise a batch file processor.

Event backbone 220 may be configured to route the received information using a category to which the information belongs. For example, event backbone 220 may categorize received information into topics belonging to three general categories: ingestion topics for information in a schema other than the common data model, such as a schema belonging to the system of record (e.g., a table, file, or the like); common data model topics for information in a schema compliant with the common data model; and purpose-built topics for information in a schema that does not fit into the common data model due to gaps in the common data model (e.g., due to the information having data not recognized by the common data model). Event backbone 220 may be further configured to route information based on the category. For example event backbone 220 may route information belonging to the ingestion topics to translator 230 to be transformed into the common data model. and information belonging to the common data model topics or the purpose-built topics to database 240 for storage. Event backbone 220 may be further configured to send information to connector 210. For example, event backbone 220 may send information to connector 210 on an ad-hoc basis, or as a result of an event. In some embodiments, event backbone 220 may be configured to receive information that has been modified by an external application. For example, event backbone 220 send information to a streaming component for further processing (e.g., based on user actions received through, for example an application programming interface (API), or the like). The streaming component may then send the modified information to event backbone 220.

Translator 230 may be configured to transform received information into a common data model. In some embodiments, translator 230 may be configured to transform all information belonging to a category. For example, translator 230 may indicate to event backbone 220 that it wishes to receive information belonging to the ingestion topic category, commonly referred to as "subscribing." In this manner, all information not complying with the common data scheme may be transformed without sharing it to other components of the system.

Figure 3:
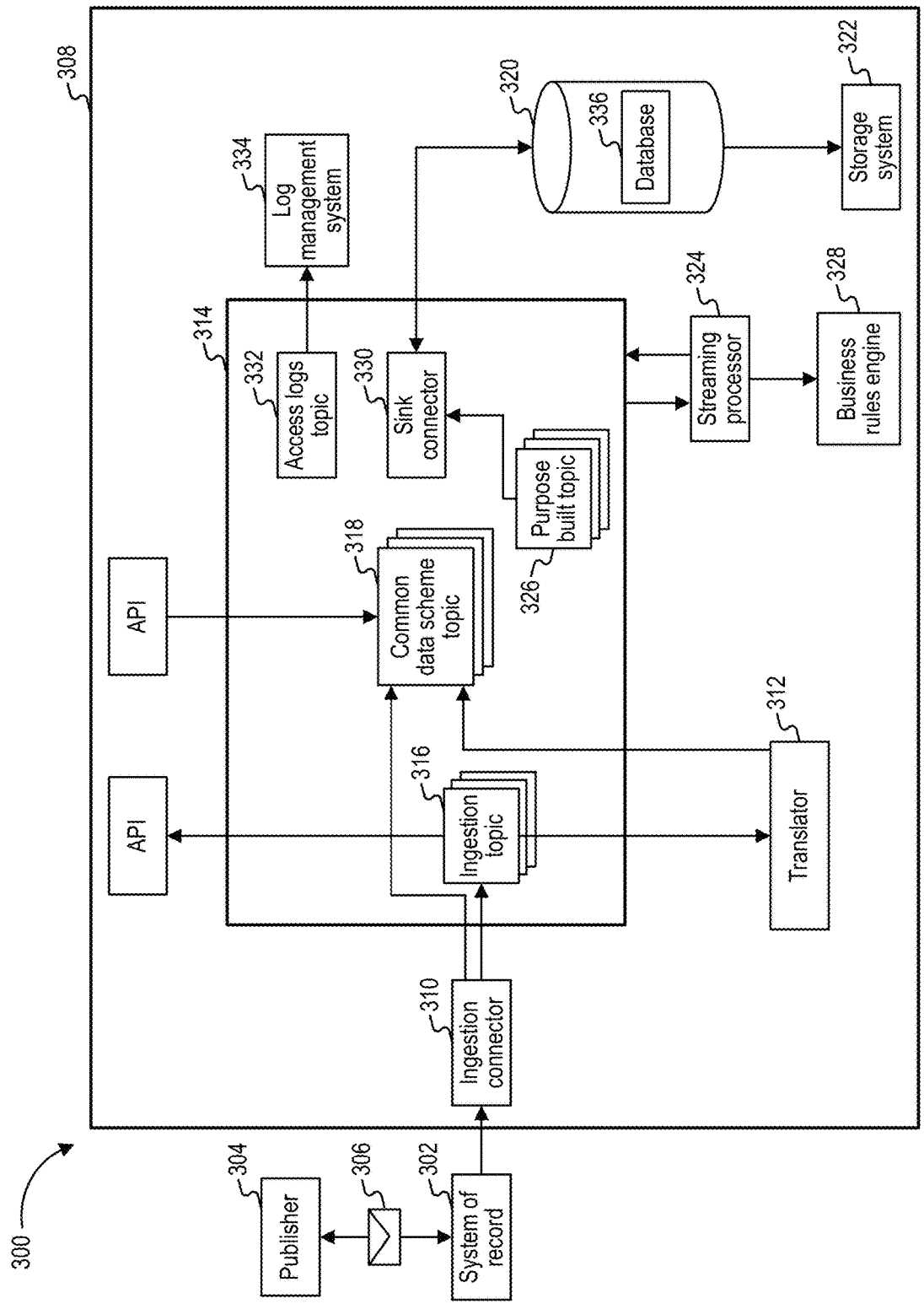
FIG. 3 is a schematic representation of another exemplary computer-implemented system for processing digital experience information in accordance with some embodiments.

FIG. 3 depicts an exemplary computer-implemented system 300 for processing digital experience information in accordance with some embodiments. The computer-implemented system 300 may create a book of reference that includes data for all types of events, such as banking or credit transactions. Such a book of reference may, be a central data location and may be used, for example, by applications, including micro-applications, to read and write data.

The computer-implemented system 300 may comprise a system of record 302 configured to receive, from a publisher 304, a transactional event 306. The transactional event 306 may comprise transactional event data. The system 300 may comprise a central data location 308 communicatively connected to the system of record 302. The central data location 308 may comprise an ingestion connector 310 configured to receive the transactional event data from the system of record 302. The central data location 308 may comprise a translator 312 configured to transform the transactional event data from the ingestion connector 310 into a common data scheme. The common data scheme may be configured to allow integration between transactional events. For example, a transactional event of one type (e.g., a credit card payment) could be configured in the same data scheme as a transactional event of another type (e.g., a banking transfer), so that the transactional events can each be accessed by an application. The common data scheme may be BAN (Banking Industry Architecture Network scheme).

The central data location 308 may comprise an event backbone 314 communicatively connected to the translator 312. The event backbone may comprise an ingestion topic 316. The event backbone 314 may comprise a common data scheme topic 318. The common data scheme topic 318 may comprise the transactional event data in the common data scheme received from the translator 312. When the ingestion connector 310 receives a transactional event 306 from the system of record 302, it may determine whether the transactional event 306 is in the common data scheme.

If the transactional event data in the transactional event 306 is not in the common data scheme, the ingestion connector 310 can determine to pass the transactional event 306 to the ingestion topic 316 in an ingestion topic message. The translator 312 may then read from the ingestion topic 316, translate the transactional event data in the transactional event 306 to the common data scheme and write to the common data scheme topic 318. The event backbone 314, therefore, may comprise the ingestion topic 316 comprising the transactional event data before it is transformed, by the translator 312. into the common data scheme.

If the transactional event data of the transactional event 306 is already in the common data scheme. the ingestion connector 310 may then write to the common data scheme topic 318 without translation by the translator 312.

The central data location 308 may include an event store 320 communicatively connected to the event backbone 314. The event store 320 may be configured to receive the ingestion topic 316 or common data scheme topic 318 from the event backbone 314. The event store 320 may be configured to store the topic in a storage system 322. The storage system 322 may be configured to allow an out-of-order query to modify query cost.

The central data location 308 may include a streaming processor 324 configured to stream the transactional event data to a subscriber. The streaming processor 324 may be configured to stream the transactional event in real-time. The streaming processor 324 may be configured to receive the transactional event data 306 from the event backbone. The event backbone 314 may be configured to receive the transactional event data from the event store 320. The streaming processor 324 may be configured to receive the transactional data from the event store 320. The event backbone 314 may be communicatively connected to the ingestion connector 310. The event backbone 314 may comprise a purpose-built topic 326 comprising a portion of the transactional event data that is not compliant with the common data scheme.

The central data location may comprise a business rules engine 328 configured to supply business rules to the streaming processor 324. The business rules engine 328 may externalize business rules from application code. The streaming processor 324 may be further configured to convert the transactional event data into the common data scheme using the business rules. The streaming processor 324 may comprise a business rule, and the streaming processor 324 may be further configured to convert the transactional event data into the common data scheme using the business rule.

The event backbone 314 may further comprise a sink connector 330 communicatively connected to the event store 320. The sink connector 330 may be configured to transform the transactional event data from the topic 316, 318, or 325 into a query data scheme for storage in the event store 320. The sink connector 330 may be configured to write the topics 316, 318, or 325 to the event store 320. The sink connector 330 may be configured to transform the common data scheme topic 318 into a purpose-built topic. The topic may be a SIAN topic. The translator 312 may be configured to transform the transactional event data from the ingestion connector 310 into a SIAN-compliant data scheme.

The event backbone 314 may further comprise an access logs topic 332 communicatively coupled to a log management system 334. The access logs topic 332 may be configured to record access to the event backbone 314.

The event store 320 may be further configured to permanently store the transactional event 306. The event store 320 may comprise a database 336. The database 336 may be a RDBMS database. The database 336 may be a NoSQL database.

Figure 4:
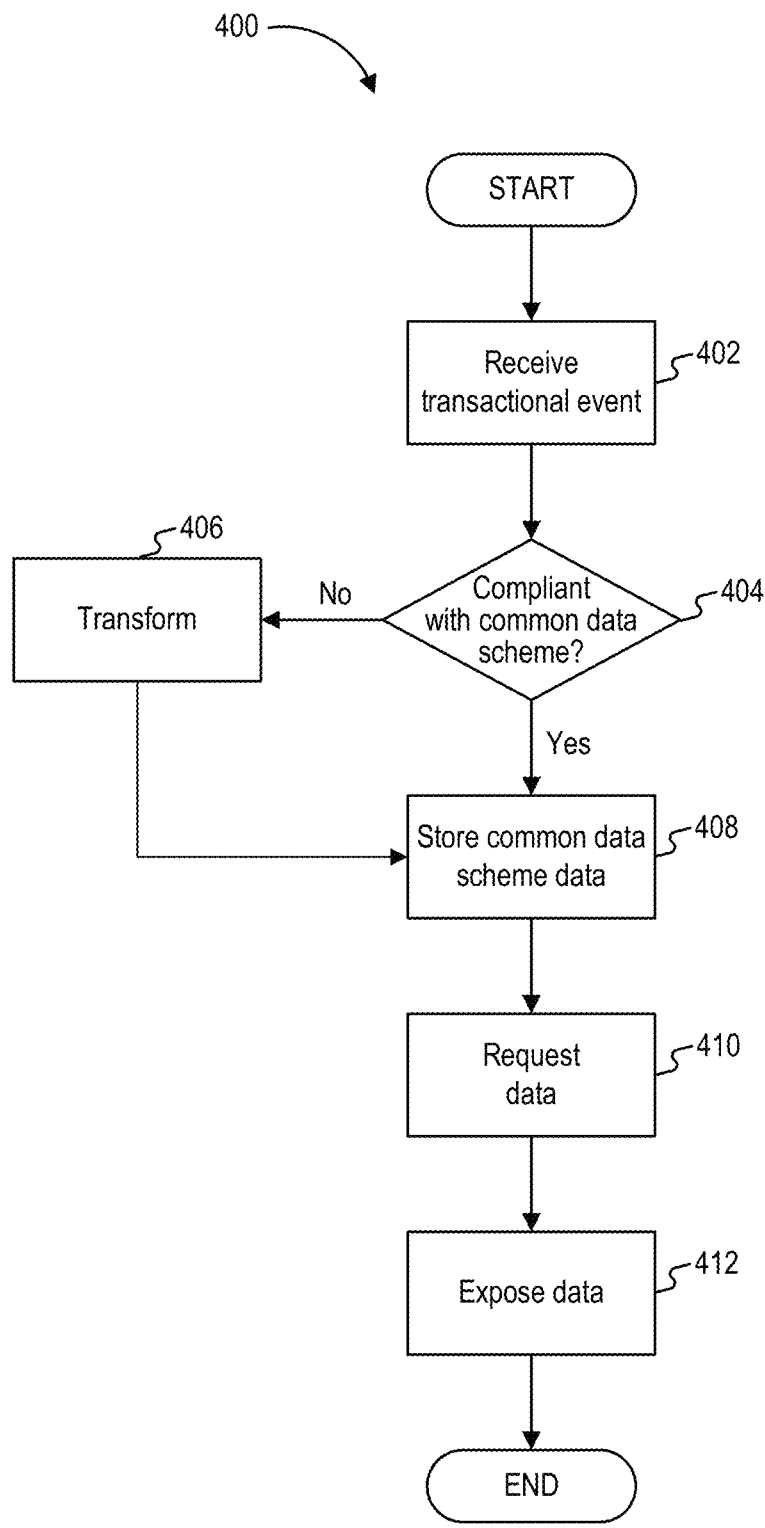
FIG. 4 is a flowchart of an exemplary computer-implemented method for processing digital experience information in accordance with some embodiments.

FIG. 4 depicts an exemplary computer-implemented method 400 for processing digital experience information in accordance with some embodiments. The method 400 may comprise the step 402 of receiving a transactional event from a publisher. The transactional event may comprise transactional event data. The method may comprise the step 404 of determining whether the transactional event data is compliant with a common data scheme. The method may comprise the step 406 of transforming the transactional event data into common data scheme compliant data. The method may comprise the step 408 of storing the common data scheme data in an event store. the method may comprise the step 410 of receiving a request from the subscriber to expose the common data scheme compliant data. The request may allow the subscriber to query the common data scheme compliant data on an ad-hoc basis. The method may comprise the step 412 of exposing the common data scheme compliant data to a subscriber in real-time.

System with a Passive Ingestion Connector

In some exemplary systems as disclosed herein, passive ingestion connectors can collect data in real-time and copy the data into an event backbone to make the data available for processing. The data may be available for processing, for example, by streaming applications with little to no changes on an existing system of record. A change data capture as part of the passive ingestion connector may be used for such a system. Additionally or alternatively, batch file ingestion may be used as part of a passive ingestion connector.

Figure 5:
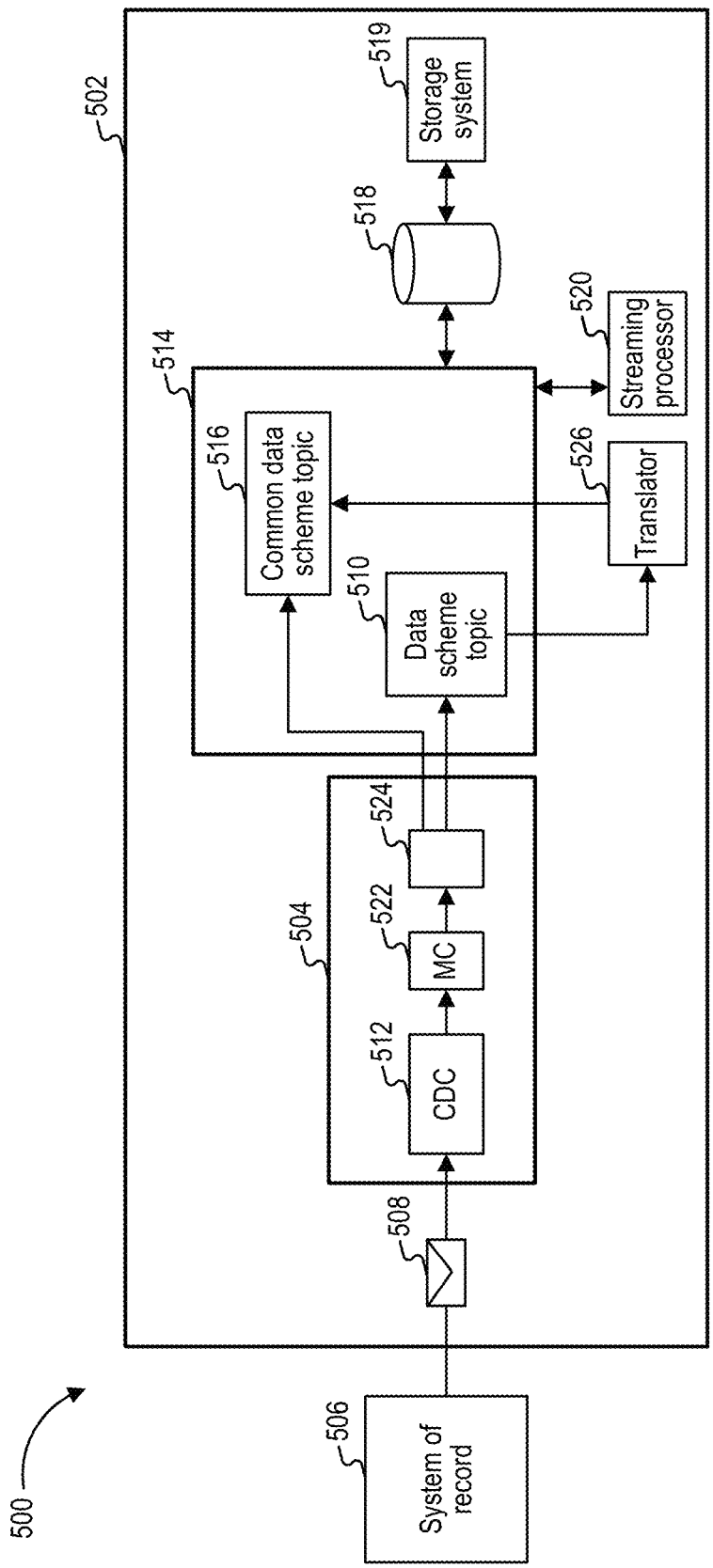
FIG. 5 is a schematic representation of another exemplary computer-implemented system for processing digital experience information in accordance with some embodiments using a passive ingestion connector.

FIG. 5 depicts an exemplary computer-implemented system 500 for processing digital experience information in accordance with some embodiments. The system 500 may comprise a central data location 502. The central data location 502 may comprise an ingestion connector 504. The ingestion connector 504 may be configured to receive, from a system of record 506, a transactional event 508 comprising transactional event data. The ingestion connector 504 may be configured to collect the transactional event data from the transactional event 506. The ingestion connector 504 may be configured to place the transactional event data onto a data scheme topic 510. The ingestion connector 504 may comprise a change data capture 512 configured to determine and track data changes. The change data capture 512 may aid in real-time collection of data by the ingestion connector 504 by, for example, reducing the amount of data to be passed.

The central data location may include an event backbone 514. The event backbone 514 may be communicatively connected to the ingestion connector 504. The event backbone may comprise a common data scheme topic 516. The common data scheme topic 516 may comprise one or a plurality of transactional events. The common data scheme topic 516 may be formed from the data scheme topic 510. The common data scheme topic 516 may comprise transactional event data that the change data capture 512 determined is changed.

The central data location 502 may comprise an event store 518 communicatively connected to the event backbone 514. The event store 518 may be configured to receive the common data scheme topic 516 from the event backbone 514. The event store 518 may be configured to store the common data scheme topic 516 in a storage system 519 The central data location 502 may comprise a streaming processor 520 configured to stream the transactional event data to a subscriber.

The ingestion connector 504 may further comprise a message-oriented middleware component 522 communicatively connected to the change data capture 512. The ingestion connector may further comprise a connecting logic 524 communicatively connected to the change data capture 512 and the middleware component 522. The connecting logic 524 may be configured to connect the ingestion connector 504 to the event backbone 514.

The system of record 506 may be configured to be aware of the event backbone 514, allowing the ingestion connector 504 to receive the transactional event 508 in real-time.

Figure 6:
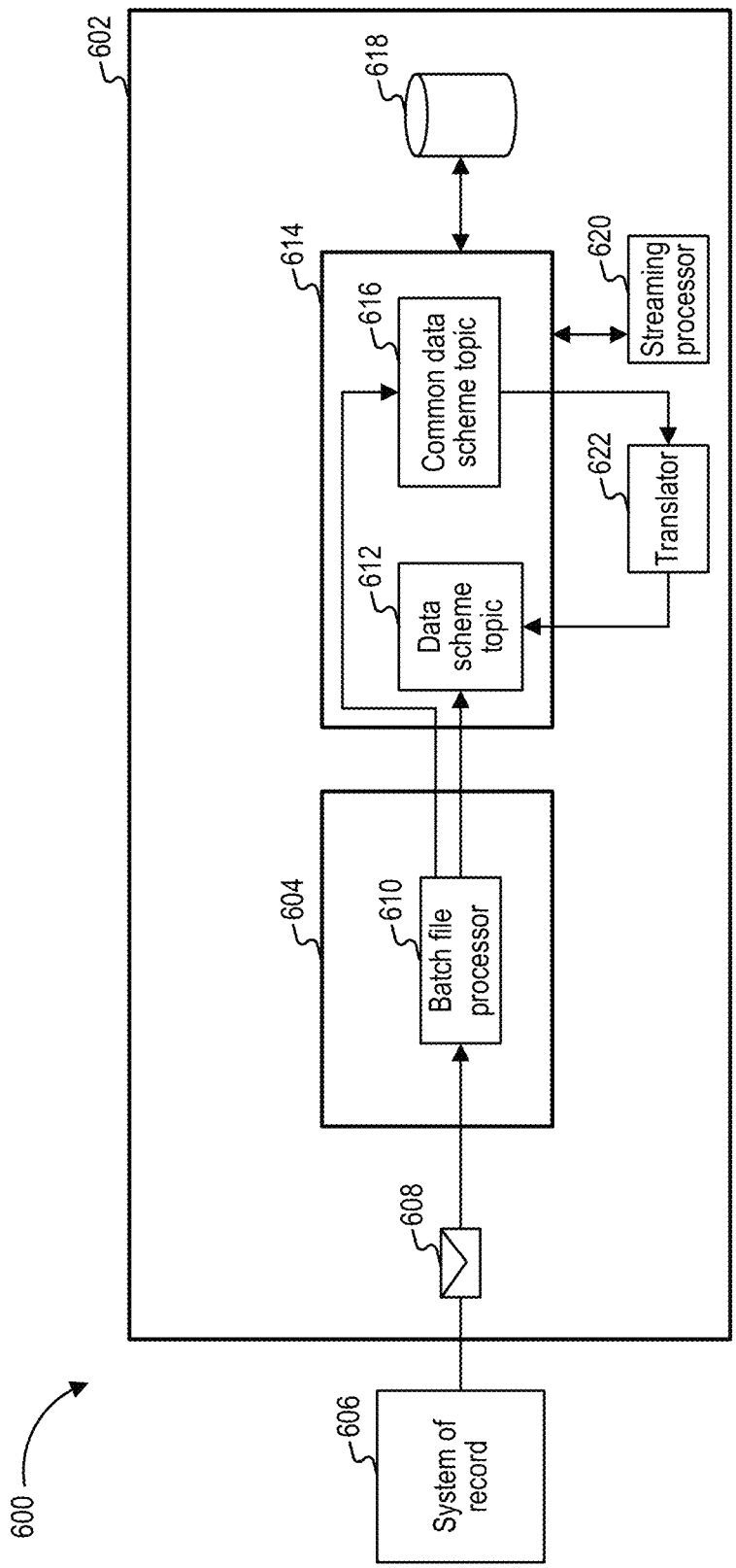
FIG. 6 is a schematic representation of another exemplary computer-implemented system for processing digital experience information in accordance with some embodiments using a passive ingestion connector.

Batch file processor may also be used for passive ingestion. FIG. 6 depicts an exemplary computer-implemented system 600 for processing digital experience information in accordance with some embodiments. The system 600 may comprise a central data location 602. The central data location 602 may comprise an ingestion connector 604. The ingestion connector 604 may be configured to receive, from a system of record 606, a batch file 608.

The batch file 608 may comprise transactional event data. The ingestion connector 604 may comprise a batch file processor 610. The batch file processor 610 may be configured to place the transactional event data onto a data scheme topic 612. The central data location 602 may comprise an event backbone 614. The event backbone 614 may comprise a common data scheme topic 616. The common data scheme topic 616 may comprise one or a plurality of transactional events. The common data scheme topic 616 may be formed from the data scheme topic 612. The central data location 602 may comprise an event store 618 configured to store the common data scheme topic 616. The central data location 602 may comprise a streaming processor 620 configured to stream, to a subscriber, a data scheme message. The system of record 606 may be configured to be aware of the event backbone 614, allowing the ingestion connector 604 to receive the one or a plurality of transactional events in real-time.

System with an Active Ingestion Connector

Figure 7:
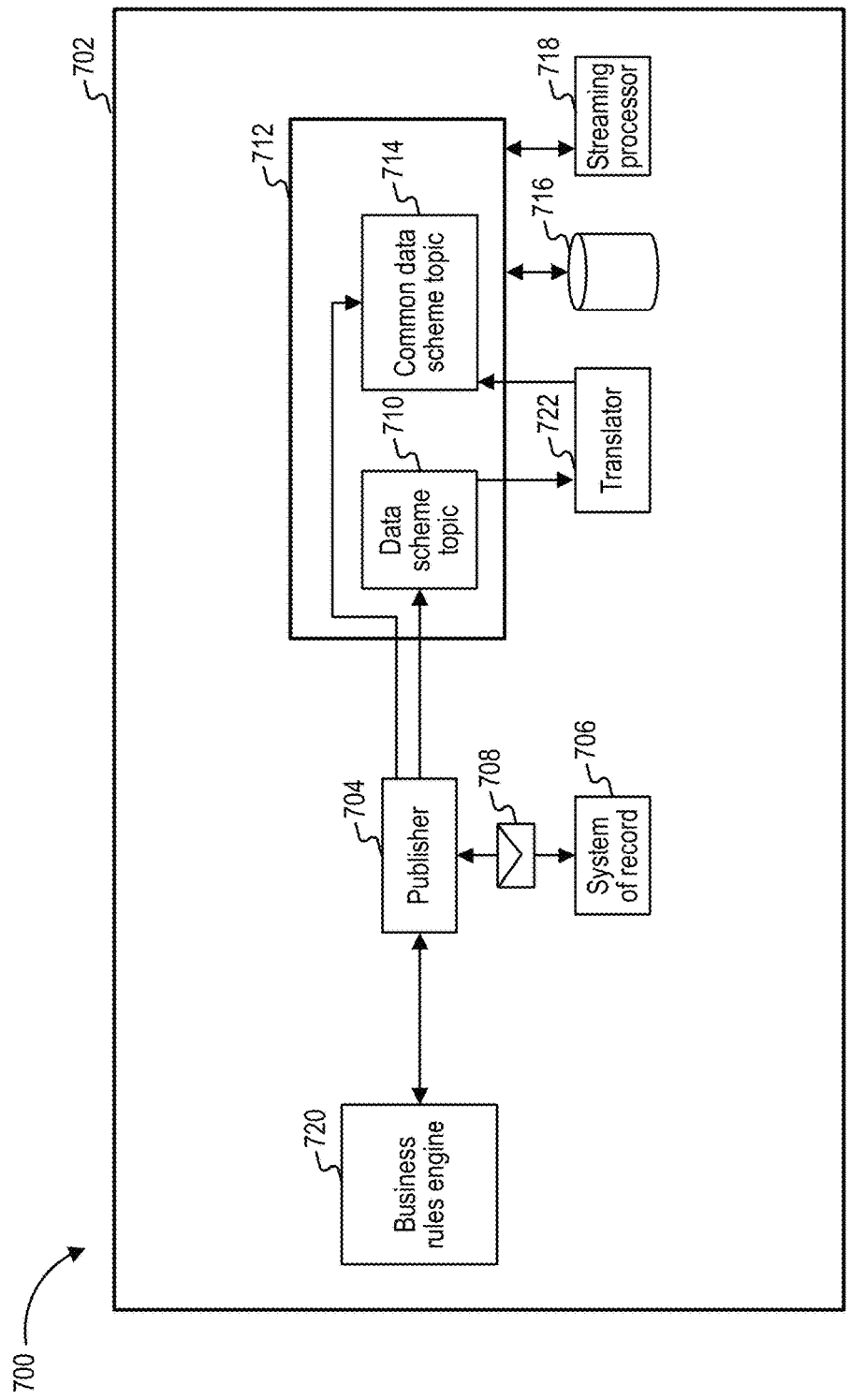
FIG. 7 is a schematic representation of another exemplary computer-implemented system for processing digital experience information in accordance with some embodiments using an active ingestion connector.

In some exemplary systems as disclosed herein, active ingestion connectors can enable a system of record to send data in real-time to an event backbone. In some exemplary systems, active ingestion connectors may use publishers, such as APIs, to write directly to topics for active ingestion. FIG. 7 depicts an exemplary computer- implemented system 700 for processing digital experience information in accordance with some embodiments. The system 700 may comprise a central data location 702. The central data location 702 may comprise a publisher 704 configured to publish, to a system of record 706, a transactional event 708 comprising transactional event data. The publisher 704 may be configured to collect the transactional event data from the transactional event 708. The publisher 704 may be configured to place the transactional event data onto a data scheme topic 710. The data scheme topic 710 may comprise a data scheme message. The central data location 702 may comprise an event backbone 712. The event backbone 712 may comprise a common data scheme topic 714. The common data scheme topic 714 may comprise one or a plurality of transactional events. The common data scheme topic 714 may be formed from the data scheme message. The central data location 702 may comprise an event store 716 configured to store the common data scheme topic 714. The central data location 702 may comprise a streaming processor 718 configured to stream, to a subscriber, the data scheme message.

The central data location 702 may comprise a business rules engine 720 configured to supply business rules tee the publisher 704. The publisher 704 may be further configured to convert the transactional event data into a common data scheme using the business rules. The publisher 704 may comprise a business rule. The publisher 704 may be further configured to convert the transactional event data into a common data scheme using the business rule.

System with a Translator

Figure 8:
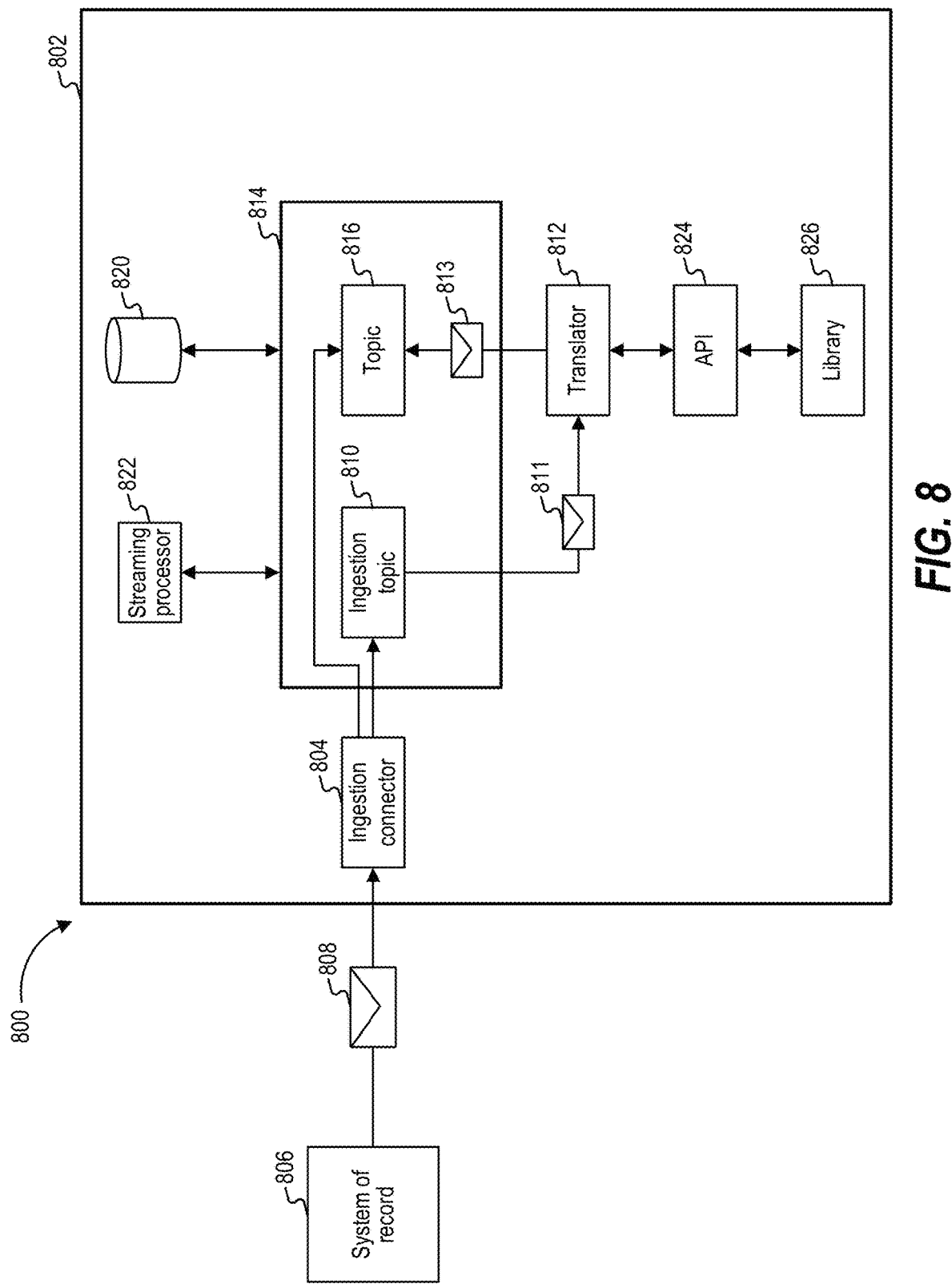
FIG. 8 is a schematic representation of another exemplary computer-implemented system for processing digital experience information in accordance with some embodiments using a translator.

Some computer implemented systems disclosed herein include translators operable to transform ingestion topic messages into common data scheme messages. Additionally, some computer implemented systems disclosed herein allow ingestion topics to be enriched by an API. The translating and enriching functionality are one way some systems disclosed herein may create a book of reference in a common data scheme for numerous applications, such as micro-applications. FIG. 8 depicts an exemplary computer-implemented system 800 for processing digital experience information in accordance with some embodiments. The system 800 may comprise a central data location 802. The central data location 802 may comprise an ingestion connector 804. The ingestion connector 804 may be configured to receive in real-time, from a system of record 806, a transactional event 808 comprising transactional event data. The ingestion connector 804 may be configured to collect the transactional event data from the transactional event 808. The ingestion connector 804 may be configured to place the transactional event data onto an ingestion topic 810 in an ingestion topic message 811. The central data location 802 may comprise a translator 812 configured to transform the ingestion topic message 811 into a common data scheme message 813. The central data location 802 may comprise an event backbone 814. The event backbone 814 may comprise a topic 816 comprising one or a plurality of transactional events. The topic 816 may be formed from the common data scheme message 813. The central data location 802 may comprise an event store 820 configured to store the topic 816. The central data location 802 may comprise a streaming processor 822 configured to stream, to a subscriber, the common data scheme message 813.

The translator 812 may be configured to enrich the ingestion topic message 811 with external data—that is data from sources other than directly from the ingestion connector 804—by calling an API 824. The external data may be BIAN compliant data. The external data may be geographic data. The external data may originate from applications, components of the central data location, or any other suitable origin. The API 824 may be communicatively coupled to a library 826. The library 826 may supply data or executable operations for processing or producing data. The API 824 may be configured to convert the common data scheme message 813 into a BIAN compliant data scheme.

Accordingly, as shown in FIG. 8, the translator 812 is operable to receive an ingestion topic message 811 and translate the message 811 into a common data scheme message 813. The translator 812 is also operable to use external data, such as the API 824 to further process the data. Finally, the translator writes the common data scheme message 813 to the topic 816 in a common data scheme, The translator 812, has thereby transformed the ingestion topic message 811 into a common data scheme format. The underlying transactional event data contained within the ingestion topic message can now be stored via the event store 820 or written to the streaming processor 822. Now in the common data scheme format, the one or more transactional events are now easily accessible by other applications and by the user from the event store 820 and the streaming processor 822.

System with a Sink Connector

Figure 9:
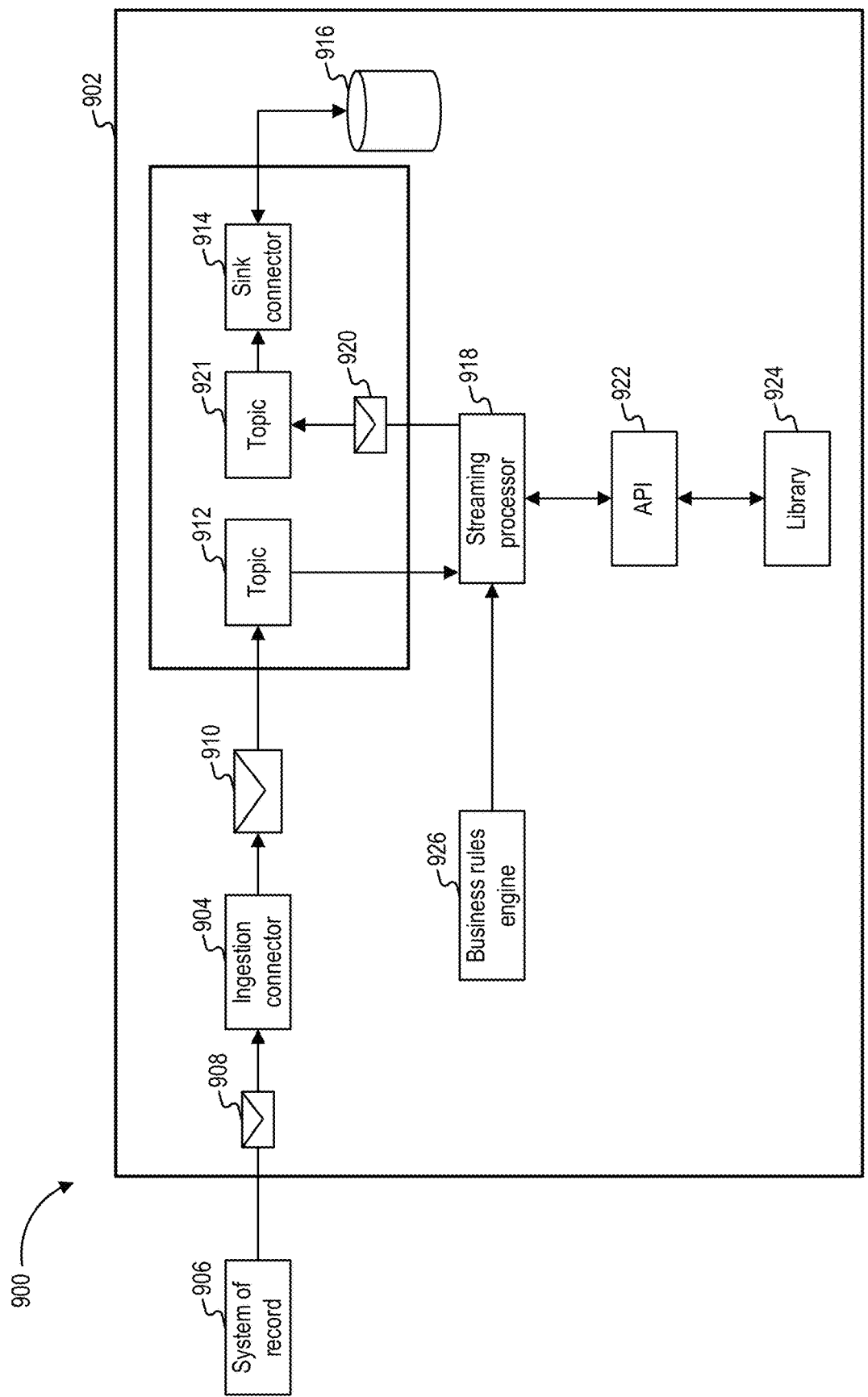
FIG. 9 is a schematic representation of another exemplary computer-implemented system for processing digital experience information in accordance with some embodiments using a sink connector.

Some embodiments of the present disclosure may comprise a sink connector. The sink connector may write events into an event store such that the data can be queried. Therefore, a sink connector can allow a book of reference or central data location to access stored data such as historical data. FIG. 9 depicts an exemplary computer-implemented system 900 for processing digital experience information in accordance with some embodiments. The system 900 may comprise a central data location 902. The central data location 902 may comprise an ingestion connector 904. The ingestion connector 904 may be configured to receive in real-time, from a system of record 906, a transactional event 908 comprising transactional event data. The ingestion connector 904 may be further configured to collect the transactional event data from the transactional event 908. The ingestion connector 904 may be further configured to place the transactional event data into a common data scheme message 910. The ingestion connector 904 may be further configured to place the common data scheme message 910 containing the transactional event data onto a topic 912. The topic 912 may comprise one or a plurality of transactional events. The central data location 902 may comprise a sink connector 914 configured to transform the topic 912 into a purpose-built topic. The sink connector 914 may be configured to map, write, or send the transactional event data of the topic 912 to an event store 916 of the central data location 902. The event store 916 may be configured to store the topic 912. The central data location 902 may comprise a streaming processor 918. The streaming processor 918 may be configured to transform the common data scheme 910 message into a query message 920. The streaming processor 918 may be configured to place the common data scheme message onto a topic 921. The streaming processor 918 may be configured to stream the query message 920 to a subscriber.

The event store 916 may be a JDBC (Java Database Connectivity) compliant data store. The sink connector 914 may be a JDBC sink connector.

The streaming processor 918 may be further configured to enrich the common data scheme message 910 with external data by calling an API 922. The external data may be BIAN compliant data. The external data may be geographic data. The API 922 ray be communicatively coupled to a library 924. The API 922 may be configured to convert the common data scheme message 910 into a BIAN compliant data scheme.

The central data location 902 may further comprise a business rules engine 926. The business rules engine 926 may be configured to supply business rules to the streaming processor 918. The streaming processor 918 may be configured to transform the common data scheme message 910 into the query message 920 using the business rules.

The streaming processor 918 may further comprise a business rule. The streaming processor 918 may be configured to transform the common data scheme message 910 into the query message 920 using the business rule.

System with a Streaming Application

Figure 10:
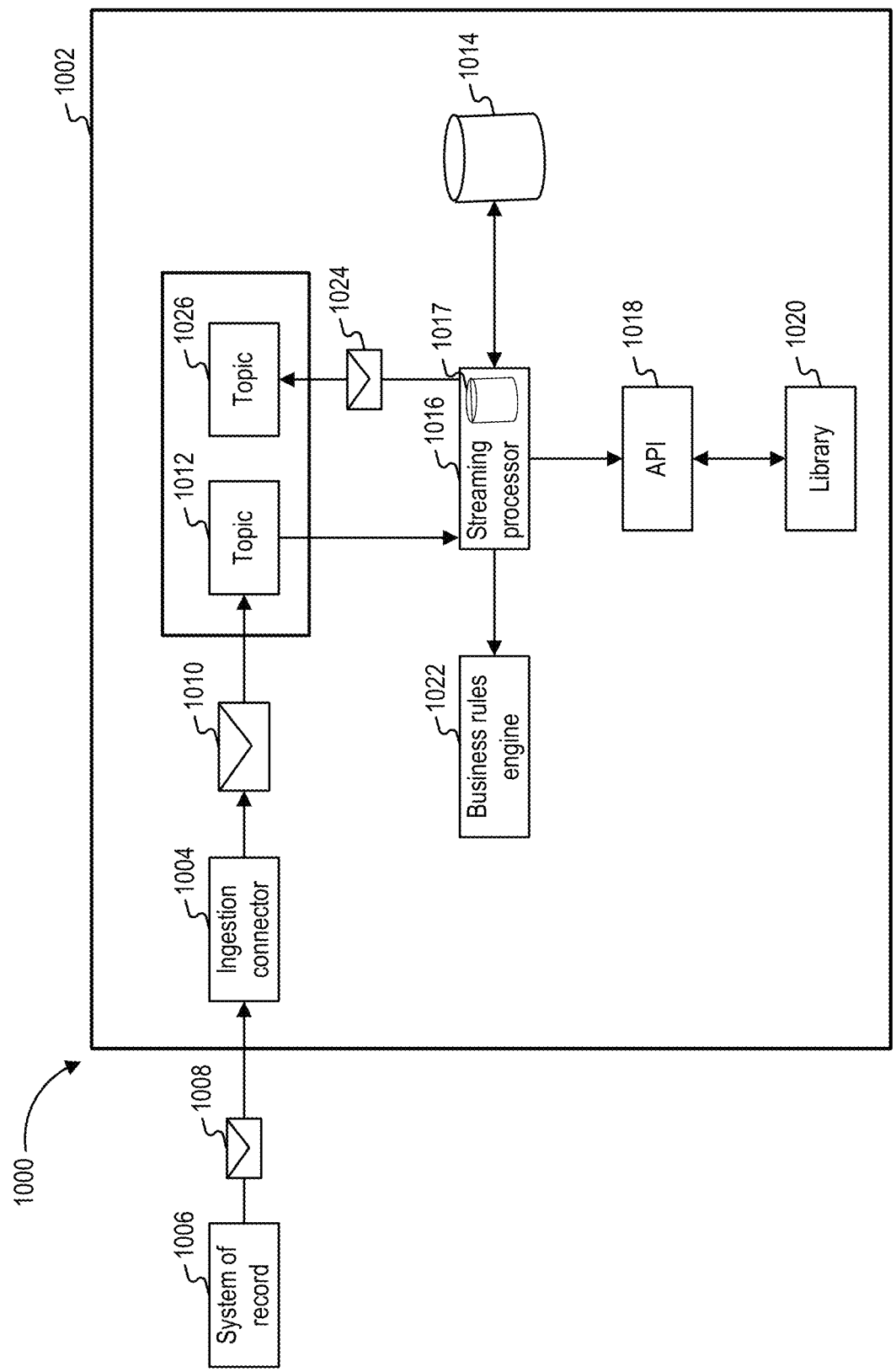
FIG. 10 is a schematic representation of another exemplary computer-implemented system for processing digital experience information in accordance with some embodiments using a streaming application.

In some embodiments, a streaming application may allow a view of real-time event streams for data sets or changing data. A streaming application can read a current state from an event store and make calculations from a message, and then write a new state to the event store. FIG. 10 depicts an exemplary computer-implemented system 1000 for processing digital experience information in accordance with some embodiments. The system 1000 may comprise a central data location 1002. The central data location 1002 may comprise an ingestion connector 1004. The ingestion connector 1004 may be configured to receive in real-time, from a system of record 1006 a transactional event 1008 comprising transactional event data. The ingestion connector 1004 may be further configured to collect the transactional event data from the transactional event 1008. The ingestion connector 1004 ray be configured to place the transactional event data into a common data scheme message 1010. The ingestion connector 1004 may be configured to place the common data scheme message 1010 containing the transactional event data onto a topic 1012. The topic 1012 may comprise one or a plurality of transactional events. The central data location 1002 may comprise an event store 1014 configured to store the topic 1012. The central data location 1002 may comprise a streaming processor 1016. The streaming processor 1016 may be configured to write the topic 1012 to the event store 1014. The streaming processor 1016 may be configured to read the topic 1012 from the event store 1014. The streaming processor 1016 may be configured to expose the topic 1012 to a subscriber 1018.

The streaming processor 1016 may comprise a cache 1017. The streaming processor 1018 may be configured to read the topic 1012 from the cache 1017.

The streaming processor 1016 may be further configured to enrich the common data scheme message 1010, with external data, by calling an API 1018. The API 1018 may be a subscriber to the streaming processor 1016. The external data may be BIAN compliant data. The external data may be geographic data. The API 1018 may be communicatively coupled to a library 1020. The API 1018 may be configured to convert the common data scheme message 1010 into a BIAN compliant data scheme. The central data location 1002 may further comprise a business rules engine 1022 configured to supply business rules to the streaming processor 1016. The streaming processor 1016 may be further configured to convert the common data scheme message 1010 from the topic 1012 into a query message 1024 using the business rules. The streaming processor 1016 may be configured to place the query message 1024 onto a topic 1026.

The streaming processor 1016 may comprise a business rule and may be further configured to convert the common data scheme message 1010 from the topic 1012 into the query message 1024 using the business rule. The streaming processor 1016 may be further configured to place the query message onto the topic 1012 or a topic 1026.

The streaming processor 1016 may be further configured to indicate a current state of the subscriber 1018, The current state may comprise a request state requesting the topic. The current state may comprise a receive state having received the topic.

System with an API Interface for Reading from an Event Store

Figure 11:
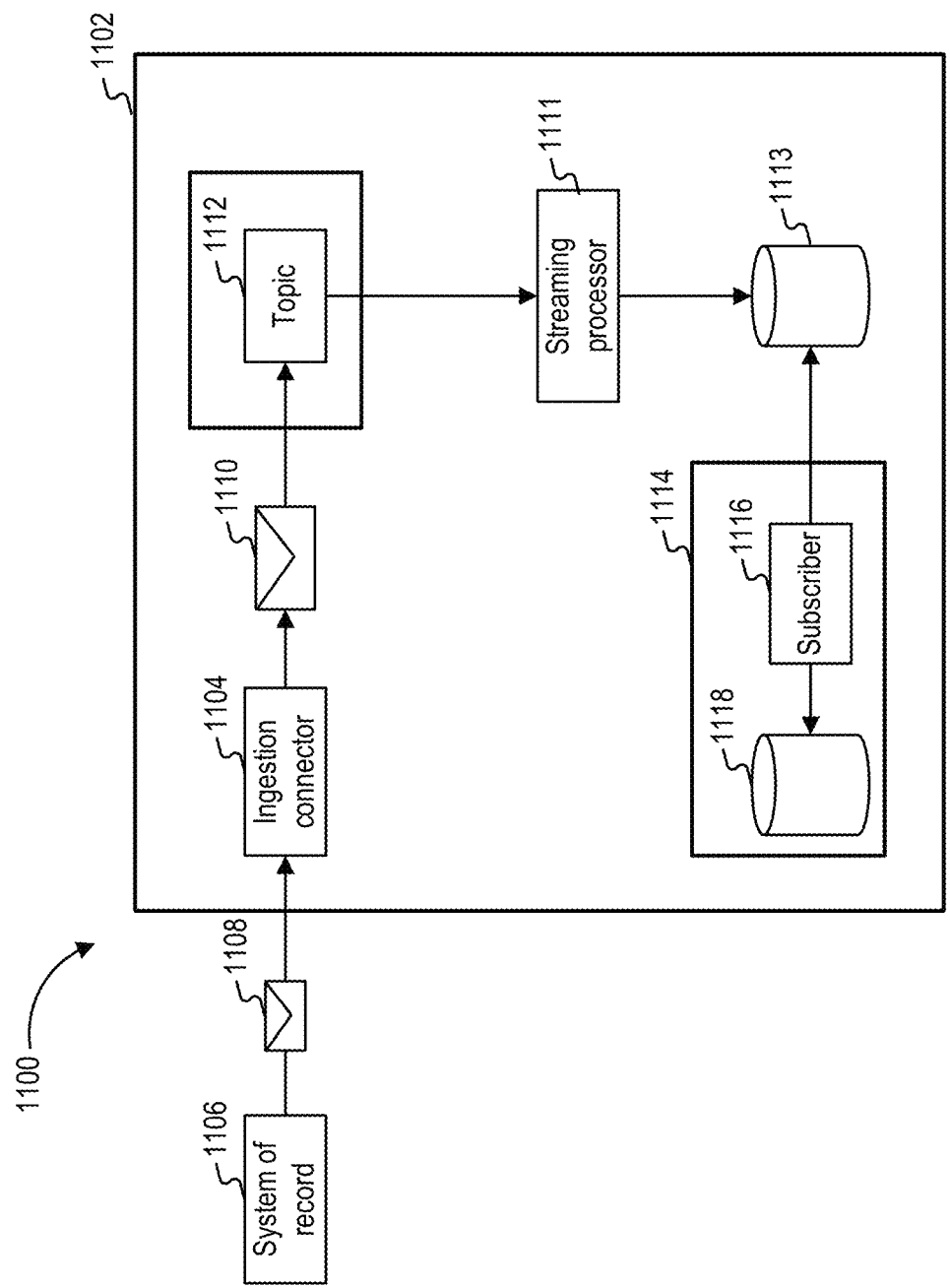
FIG. 11 is a schematic representation of another exemplary computer-implemented system for processing digital experience information in accordance with some embodiments using an API interface for reading from an event store.

In some embodiments, one or more APIs may be used to read from a database of an event store. FIG. 11 depicts an exemplary computer-implemented system 1100 for processing digital experience information in accordance with some embodiments. The system 1100 may comprise a central data location 1102. The central data location 1102 may comprise an ingestion connector 1104. The ingestion connector 1104 may be configured to receive in real-time, from a system of record 1106, a transactional event 1108 comprising transactional event data. The ingestion connector 1104 may be configured to collect the transactional event data from the transactional event 1108. The ingestion connector 1104 may be configured to place the transactional event data, in a common data scheme message 1110, onto a topic 1112 comprising one or a plurality of transactional events. The central data location 1102 may comprise a streaming processor 1111 configured to write the topic 1112 to an event store 1113. The event store 1113 may be configured to store the topic 1112. The event store 1113 may be able to expose the topic 1112 to a subscriber 1116. The subscriber 1116 may be an API that is part of or all of an API interface 1114.

The event store 1113 may be configured to expose (i.e., enable access to) the topic 1112 using the API interface 1114. The A PI interface 1114 may be configured to use a MICRON framework. The event store 1113 may comprise an event store schema. The API interface 1114 may comprise an API schema. The event store schema may follow the API schema. The event store schema may be identical to the API schema.

The API interface 1114 may comprise a cache 1118. While the cache 1118 may be external, as shown in FIG. 11, the cache 1118 may alternatively be internal to the subscriber 1116.

System with an API Interface for Reading from an Event Backbone

Figure 12:
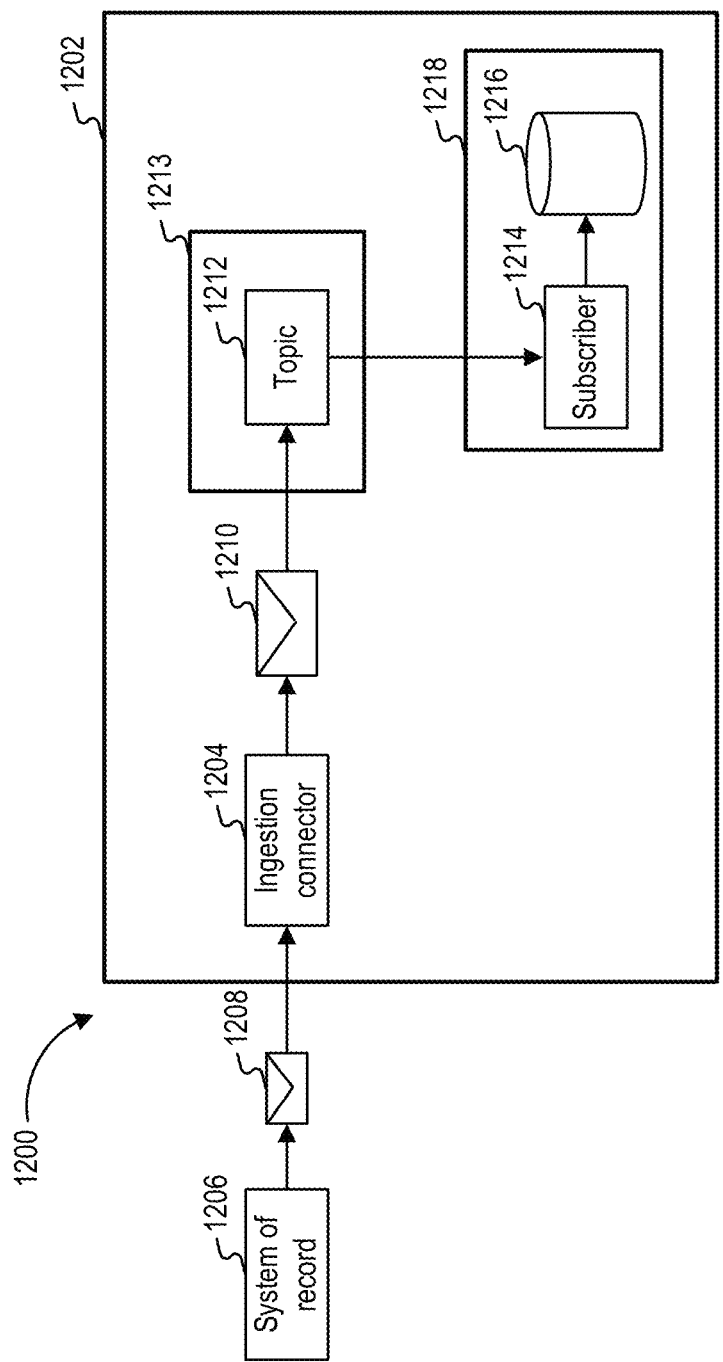
FIG. 12 is a schematic representation of another exemplary computer-implemented system for processing digital experience information in accordance with some embodiments using an API interface for reading from an event backbone.

It may be beneficial to read directly from topics of an event backbone. Such an application may be useful, for example, when a topic contains a small set of objects, where a state table can be rebuilt by reprocessing all events. FIG. 12 depicts an exemplary computer-implemented system 1200 for processing digital experience information in accordance with some embodiments. The system 1200 may comprise a central data location 1202. The central data location 1202 may comprise an ingestion connector 1204. The ingestion connector 1204 may be configured to receive in real-time, from a system of record 1206, a transactional event 1208. The transactional event 1208 may comprise transactional event data. The ingestion connector 1204 may be configured to collect the transactional event data from the transactional event 1208. The ingestion connector 1204 may be configured to place the transactional event data, in a common data scheme message 1210, onto a topic 1212 of the event backbone 1213. The topic 1212 may comprise one or a plurality of transactional events. The topic 1212 may be configured to expose the common data scheme message 1210 to a subscriber 1214 (e.g., an API).

The topic 1212 may be configured to expose the common data scheme message 1210 using an API, wherein the subscriber 1214 is an API. The subscriber 1214 may comprise a cache 1216. While shown with a cache 1216 that is external to the subscriber 1214, the subscriber 1214 may have an internal cache. The subscriber 1214 may be part of an API interface 1218. The subscriber 1214 may be configured to read the topic 1212. The topic 1212 may be a Kafka topic.

System with a Schema Registry

Figure 13:
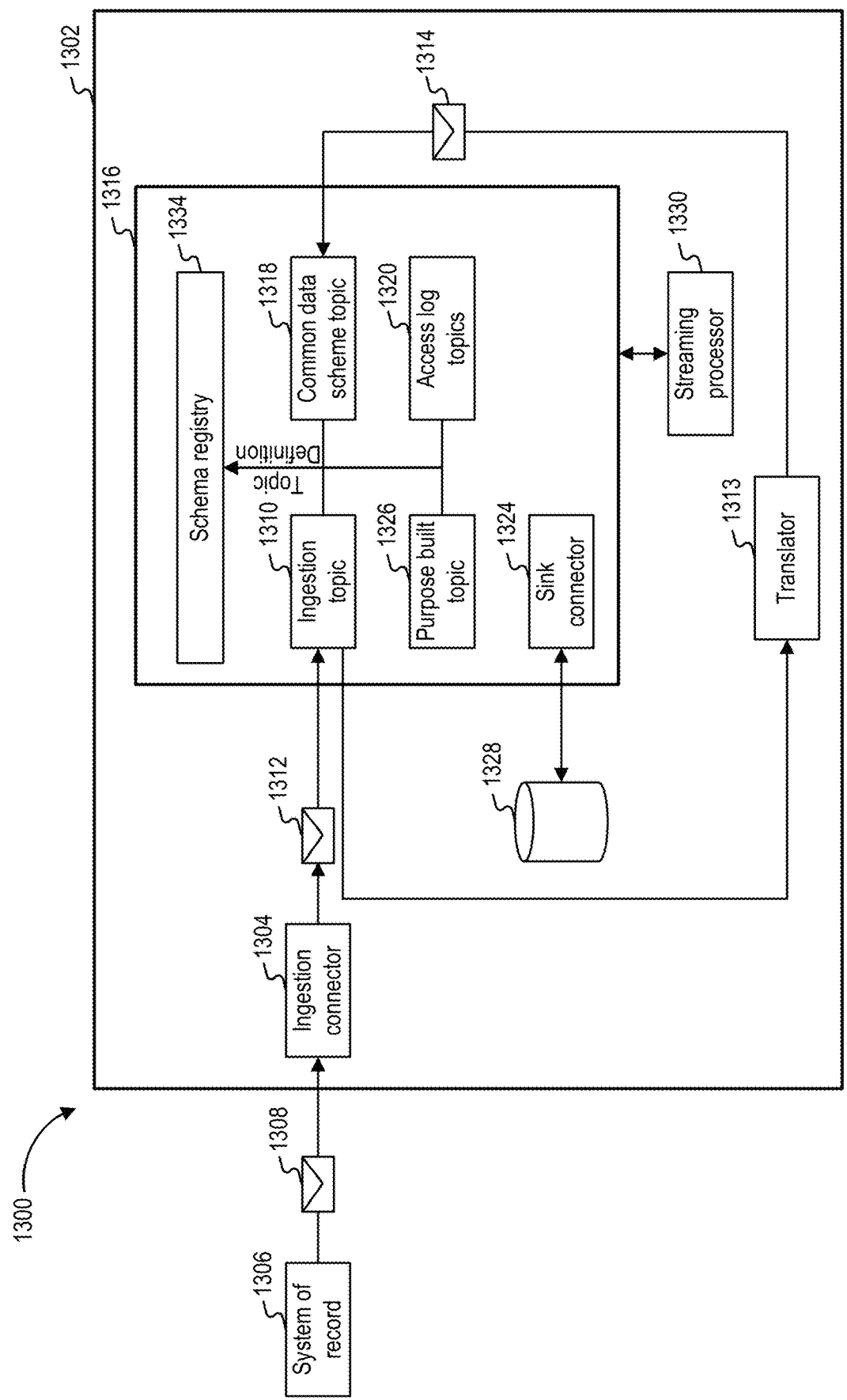
FIG. 13 is a schematic representation of another exemplary computer-implemented system for processing digital experience information in accordance with some embodiments using a schema registry.

It may be beneficial to use a schema registry that defines topics. FIG. 13 depicts an exemplary computer-implemented system 1300 for processing digital experience information in accordance with some embodiments. The system 1300 may comprise a central data location 1302. The central data location 1302 may comprise an ingestion connector 1304. The ingestion connector 1304 may be configured to receive in real-time, from a system of record 1306, a transactional event 1308. The transactional event 1308 may comprise transactional event data. The ingestion connector 1304 may be further configured to collect the transactional event data from the transactional event 1308. The ingestion connector 1304 may be configured to place the transactional event data onto an ingestion topic 1310 in an ingestion topic message 1312. The central data location 1302 may comprise a translator 1313 configured to transform the ingestion topic message 1312 into a common data scheme message 1314. The central data location 1302 may comprise an event backbone 1316. The event backbone 1316 may comprise a common data scheme topic 1318. The common data scheme topic 1318 may comprise one or a plurality of transactional events. The common data scheme topic 1318 may be formed from the common data scheme message 1314. The event backbone 1316 may comprise an access logs topic 1320 communicatively coupled to a log management system 1322. The access logs topic 1320 may be configured to record access to the event backbone 1316. The access logs topic 1320 may report the access to the log management system 1322. The log management system 1322 may be configured to store log access information. The event backbone 1316 may comprise a sink connector 1324. The sink connector 1324 may be configured to write one or more of topic 1310, 1318, 1320, and a purpose-built topic 1326 to an event store 1328. The event store 1328 may be configured to store one or more of topics 1310, 1318, 1320, and 1326. The central data location 1302 may comprise a streaming processor 1330 configured to stream, to a subscriber 1332, the common data scheme message 1314.

The ingestion topic 1310 may comprise an ingestion topic schema defined using a schema registry 1334. The common data scheme topic 1314 may comprise a common data scheme topic schema defined using the schema registry 1334. The purpose-built topic 1326 may comprise a purpose-built topic schema defined using the schema registry. The access log topic 1320 may comprise an access log topic schema using the schema registry 1324. The schema registry 1334 may follow a serialization and deserialization standard. The serialization and deserialization standard may be Apache Avro.

The present disclosure has been presented for purposes of illustration, It is not exhaustive and is not limited to precise forms or embodiments disclosed. Modifications and adaptations of the embodiments will be apparent from consideration of the specification and practice of the disclosed embodiments, For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context, Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system. networking, I/O services, and provide a user interface functionality, such as a graphical user interface ("GUI"), among other things.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents, Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents.

What is claimed:

1. A system comprising:
a central data location configured to collect information comprising a transactional event, the central data location comprising:
an ingestion connector configured to:
receive, in real-time, from a system of record, the transactional event;
collect transactional event data into a common data scheme message, wherein the common data scheme message is compliant with Banking Industry Architecture Network (BIAN); and
place the common data scheme message containing the transactional event data onto a topic, the topic configured to categorize the transactional event; and
a streaming processor configured to:
receive the common data scheme message from the topic;
transform the common data scheme message into a query message, the query message comprising the transactional event data in a format configured to be queried on an ad-hoc basis; and
place the query message onto a second topic.

2. The system of claim 1, wherein the streaming processor is further configured to call an application programming interface (API) to supplement the common data scheme message with external data.

3. The system of claim 2, wherein the external data is Banking Industry Architecture Network (BIAN) compliant data.

4. The system of claim 2, wherein the external data is geographic data.

5. The system of claim 2, wherein the application programming interface (API) is communicatively coupled to a library.

6. The system of claim 2, wherein the application programming interface (API) is configured to convert the common data scheme message into a Banking Industry Architecture Network (BIAN) compliant data scheme.

7. The system of claim 1, wherein the central data location further comprises:
a business rules engine configured to supply business rules to the streaming processor.

8. The system of claim 7, wherein the streaming processor is configured to transform the common data scheme message into the query message using the business rules.

9. The system of claim 1, wherein the streaming processor stores a business rule; and
the streaming processor is configured to transform the common data scheme message into the query message using the business rule.

10. A system comprising:
a central data location configured to collect information comprising a transactional event, the transactional event comprising transactional event data, the central data location comprising:
a topic configured to categorize the transactional event;
a streaming processor configured to:
receive a common data scheme message from the topic, wherein the common data scheme message is compliant with Banking Industry Architecture Network (BIAN);
transform the common data scheme message into a query message, the query message comprising transactional event data in a format configured to be queried on an ad-hoc basis; and place the query message onto a second topic configured to categorize the query message;

a sink connector configured to receive the query message from the second topic; and an event store, the sink connector configured to write the second topic to the event store, wherein the event store is configured to write the second topic in response to a query.

11. The system of claim 10, wherein the event store is a Java Database Connectivity (JDBC) complaint data store and the sink connector is a JDBC sink connector.

12. The system of claim 10, wherein the streaming processor is further configured to call an application programming interface (API) to supplement the common data scheme message with external data.

13. The system of claim 12, wherein the external data is Banking Industry Architecture Network (BIAN) compliant data.

14. The system of claim 12, wherein the external data is geographic data.

15. The system of claim 10, wherein the central data location further comprises a business rules engine configured to supply business rules to the streaming processor.

16. The system of claim 15, wherein the streaming processor is configured to transform the common data scheme message into the query message using the business rules.

17. The system of claim 10, wherein the streaming processor stores a business rule; and the streaming processor is configured to transform the common data scheme message into the query message using the business rule.

18. The system of claim 10, wherein the event store further comprises a database configured to store the second topic.

19. The system of claim 18, wherein the database is a RDBMS relational database management system (RDBMS) database.

20. The system of claim 18, wherein the database is a not only structured query language_(NoSQL) database.

* * * * *